United States Patent

Wulf

(10) Patent No.: US 9,937,929 B2
(45) Date of Patent: Apr. 10, 2018

(54) METHOD AND DEVICE FOR OPERATING A MOTOR VEHICLE THAT DRIVES OR IS ABLE TO BE DRIVEN IN AN AT LEAST PARTIALLY AUTOMATED MANNER

(71) Applicant: Robert Bosch GmbH, Stuttgart (DE)

(72) Inventor: Felix Wulf, Ludwgsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 8 days.

(21) Appl. No.: 15/006,601

(22) Filed: Jan. 26, 2016

(65) Prior Publication Data

US 2016/0214618 A1 Jul. 28, 2016

(30) Foreign Application Priority Data

Jan. 27, 2015 (DE) ................ 10 2015 201 369

(51) Int. Cl.
- *G08B 23/00* (2006.01)
- *B60W 40/08* (2012.01)
- *B60Q 9/00* (2006.01)
- *B60W 50/14* (2012.01)
- *B60K 28/06* (2006.01)

(52) U.S. Cl.
CPC ........... *B60W 40/08* (2013.01); *B60K 28/066* (2013.01); *B60Q 9/00* (2013.01); *B60W 50/14* (2013.01); *B60W 2040/0818* (2013.01); *B60W 2540/22* (2013.01); *B60W 2540/28* (2013.01)

(58) Field of Classification Search
CPC .................. B60K 28/066; B60Q 9/00; B60W 2040/0818; B60W 2540/22; B60W 2540/28; B60W 40/08; B60W 50/14
USPC ........................................................ 340/576
See application file for complete search history.

(56) References Cited

U.S. PATENT DOCUMENTS

| | | | | |
|---|---|---|---|---|
| 8,068,968 B2* | 11/2011 | Kondoh | ............... | B60W 30/16 180/272 |
| 9,198,575 B1* | 12/2015 | Blacutt | ................... | A61B 3/113 |
| 2010/0007523 A1* | 1/2010 | Hatav | .................... | G01C 21/26 340/901 |
| 2010/0033333 A1* | 2/2010 | Victor | ................... | A61B 3/113 340/576 |
| 2014/0276090 A1* | 9/2014 | Breed | ..................... | A61B 5/18 600/473 |
| 2015/0094899 A1* | 4/2015 | Hackenberg | ........ | B60W 50/082 701/23 |
| 2015/0161894 A1* | 6/2015 | Duncan | ................. | G08G 1/163 701/1 |

\* cited by examiner

*Primary Examiner* — Naomi J Small

(74) *Attorney, Agent, or Firm* — Norton Rose Fulbright US LLP; Gerard Messina

(57) ABSTRACT

A method for operating a motor vehicle which drives or is able to be driven at least partially automatically includes: detecting a gaze direction of a driver of the motor vehicle; inferring a driver distraction if the detected gaze direction deviates from a setpoint gaze direction beyond a predefinable measure; monitoring the driver for a secondary activity if a distracted driver was detected; and ascertaining a time period that the driver would require to take over the at least partial control of the motor vehicle, as a function of a detected secondary activity.

14 Claims, 1 Drawing Sheet

METHOD AND DEVICE FOR OPERATING A MOTOR VEHICLE THAT DRIVES OR IS ABLE TO BE DRIVEN IN AN AT LEAST PARTIALLY AUTOMATED MANNER

BACKGROUND OF THE INVENTION

1. Field of the Invention

The present invention relates to a method for operating a motor vehicle that drives or is able to be driven in an at least partially automated manner.

2. Description of the Related Art

Methods for operating motor vehicles that are driven or able to be driven in an at least partially automated mode are generally known. Vehicle manufacturers are increasingly attempting to design motor vehicles that assume driving tasks in a partially automated or fully automated manner. For example, research is conducted for motor vehicles that allow a fully automatic operation, in which the attention of a driver is largely no longer required. In a partially automated driving mode, the vehicle executes driving tasks at least partially on its own. In the partially automated driving mode, for example, the motor vehicle may follow motor vehicles driving ahead, and in the fully automated driving mode, it drives toward a predefined destination automatically while complying with all traffic rules.

During partially automated or fully automated driving, or during the partially automated or fully automated driving operation of the motor vehicle, the driver is allowed to abandon the driving tasks as long as he or she is able to resume control of the vehicle within a predefinable period of time. Systems that monitor the driver's gaze direction with the aid of cameras are known per se, so that inferences regarding the alertness of the driver are able to be drawn on the basis of the gaze direction.

BRIEF SUMMARY OF THE INVENTION

The method of the present invention has the advantage of ensuring a very reliable fully automated or partially automated driving operation of the motor vehicle, because the attention status of the driver is analyzed and, if necessary, the alertness of the driver is increased in order to ensure a safe driving operation. To do so, a gaze direction of the driver of the motor vehicle is detected in the present invention to begin with, in particular in the at least partially automated driving mode. Driver distraction will be inferred if the detected gaze direction deviates from a setpoint gaze direction beyond a predefinable measure. In addition, if driver distraction has been detected, the driver is monitored for carrying out a secondary activity. A time period required by the driver to at least partially, in particular completely, take over control of the motor vehicle is additionally ascertained as a function of a detected secondary activity. That is to say, the driver is initially monitored for distraction. If driver distraction is actually determined, then a check will be carried out to ascertain whether the distraction is caused by the driver's secondary activity. In so doing, the type of secondary activity is preferably ascertained, as well. Depending on a secondary activity or the particular detected secondary activity, a time period required by the driver in order to assume control of the motor vehicle is determined in addition. In particular, different time periods are allocated to different secondary activities. To ascertain such time periods, testing is employed in order to determine how long the driver requires for completely or partially taking over control of the motor vehicle, starting from a secondary activity carried out just then. When ascertaining the time period, secondary activities that require more of the driver's attention, for example, may be assigned different weightings than secondary activities that permit a rapid take-over of the control by the driver. A time period in particular is a time period that starts when the driver is asked to assume control and ends when the driver actually assumes partial or in particular complete control of the vehicle. The request to assume control in particular is the warning message discussed further below.

Depending on a detected secondary activity of the driver, a warning message is preferably output to the driver in an effort to increase his alertness. If called for, on output of the warning message, which in particular depends on the detected secondary activity, will take place, the type of detected secondary activity being able to influence the type of warning message, the instant and/or intensity of the warning message. That is to say, if it is detected that the driver not only is distracted but also engaged in a secondary activity, the driver's alertness is increased as appropriate for the situation. Preferably, the method is performed only if the semi-automated or fully automated driving operation of the motor vehicle actually requires the driver's attention. This requirement, for one, may be the result of the current traffic conditions and legal regulations for another.

According to one preferred further refinement of the present invention, an instant for the output of the warning signal is determined as a function of the instant at which the distraction and/or the secondary activity have/has been detected. The instant at which the driver's attention is to be improved by the warning signal is therefore determined as a function of the point in time when the distraction and/or the secondary activity is/have been detected. In particular the time period that begins when the distraction and/or the secondary activity are/is detected, and ends with the output of the warning signal is calculated. This takes the time into account during which the driver is distracted and engaged in the secondary activity. For example, different time periods which may not be exceeded are predefined for different secondary activities of the driver, in order to ensure the safety of the driving operation. The time periods are then calculated on the basis of the time when the distraction is detected and/or on the basis of the time when the secondary activity was detected, and the warning signal is output once the time period has elapsed. In this way the instant for outputting the warning signal is selected in a manner that is situationally appropriate.

Moreover, it is preferably provided to ascertain the time period as a function of state parameters of the driver, in particular the age, gender, a previously detected reaction time, and/or the driver's eyesight. The duration thus is predefined individually for the driver, so that the driving safety for every driver of the motor vehicle can be ensured in an optimal manner. For example, a shorter time period is predefined for drivers have poor eyesight, so that the driver's alertness can be increased earlier.

According to one advantageous further refinement of the invention, the instant for the output of the warning signal is selected as a function of the ascertained time period. As mentioned earlier, the instant is chosen in that, starting from the detection of the distraction and/or secondary activity, the instant for outputting the warning signal is selected as a function of the time period.

Moreover, it is preferably provided to infer a secondary activity of the driver as a function of an eye movement of the driver. Monitoring of the gaze direction of the driver, for instance with the aid of a camera device that includes at least one camera and at least one infrared radiator is known per se. The movement may be utilized for plotting a movement characteristic, which is compared to predefined movement reference characteristics. Each movement reference characteristic is preferably assigned to a predefined secondary activity. For example, a reading movement of the eyes is specified as predefined movement reference characteristic. It is characterized by a line-by-line or horizontal back-and-forth movement of the eyes, for instance, the gaze direction moving in the downward direction with each back-and-forth movement. It may also be the case that a downward moving gaze direction is already detected as reading movement because this indicates the holding of a book or the like, for example. The speed of the eye movement, too, may be used for detecting a reading movement if, for instance, the movement in the reading direction is slower than the return movement of the eyes in the direction of the start of a line.

According to one preferred further development of the present invention, a secondary activity of the driver moreover is inferred as a function of a movement of the driver's lips. Monitoring the mouth region of the driver in particular makes it possible to detect whether the driver is conversing, for example, talking on the phone or to a passenger. By analyzing an image of the driver, it is possible to detect the driver's mouth region and to monitor it for movements. For practical purposes, the camera image of the camera device employed for detecting the driver's gaze direction is used toward this end.

In addition, a secondary activity of the driver is preferably detected as a function of a hand movement and/or hand position. If the driver holds one hand to his ear, for example, it is inferred that the driver is on the phone. If it is detected that the driver points with his hand in a certain direction that in particular deviates from the setpoint gaze direction, it may be deduced that the driver is pointing to an object in the environment of the vehicle, for instance to point out the object to a passenger. Furthermore, the fact that the driver's lips are moving leads to the conclusion that the driver provides information about the object to the passenger, so that his attention to the driving situation is reduced even further. Moreover, it may be detected, for instance based on a movement of one hand or both hands of the driver, whether the driver is eating or drinking and is therefore distracted from the driving situation on account of the food consumption. A hand motion and/or hand position may furthermore lead to the conclusion that the driver is smoking a cigarette or the like. To do so, using the image analysis, the glow of a cigarette, for example, is able to be detected with the aid of the image recorded by the camera, and smoking be inferred as a secondary activity.

In addition, secondary activity of the driver is preferably detected as a function of an actuation of an operating device of the motor vehicle. Monitoring of an entertainment system, a navigation system and/or a climate-control system of the vehicle for inputs or operating inputs of the driver is provided, in particular. If an operating input on the part of the driver is recorded once a preoccupation of the driver has already been detected, it will be inferred that the driver is operating the individual operating device as a secondary activity. The type and/or the instant of the output of the warning signal are preferably selected as a result.

The warning signal or the warning message is output to the driver, preferably in haptic, acoustic and/or visual form. An acoustically output warning signal has the advantage of drawing the driver's attention regardless of what he or she is currently looking at. The visual warning signal is advantageous insofar as the driver's attention is drawn into a certain gaze direction if this happens to be advantageous for the traffic situation at hand. For example, a visual warning signal makes it possible to alert the driver to the happenings that are not occurring in the visual field of the normal setpoint gaze direction.

The present inventive also provides a device for detecting the gaze direction of the driver of the motor vehicle; at least one means for detecting a secondary activity of the driver; and a control device that executes the inventive method when used as intended. In the simplest case, the first device and the means are developed as a device, especially a camera device, which generates a camera image of the driver that is used by a corresponding image analysis in the manner described earlier already in order to ascertain the warning signal. As an alternative, the first device and the means are different devices, the device in particular being realized as the previously already mentioned camera device, and the means being developed as operating device of the motor vehicle, for instance. This already results in the previously enumerated advantages.

In the following text, the present invention is to be elucidated in greater detail with the aid of the drawing.

DETAILED DESCRIPTION OF THE INVENTION

Figure 1:
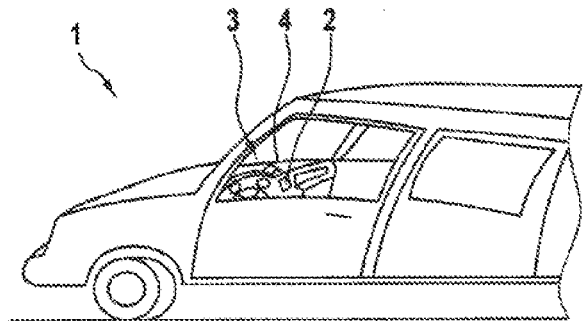
FIG. 1 shows a motor vehicle in a simplified illustration.

FIG. 1 shows a simplified illustration of motor vehicle 1, which is able to be switched into a partially automated or fully automated mode, so that motor vehicle 1 is driving on its own or autonomously at least intermittently and under suitable general conditions. For this purpose motor vehicle 1, for example, is equipped with an environment sensor system for sensing the immediate environment of motor vehicle 1 (not shown here), and a navigation system 2, with the aid of which the driver of motor vehicle 1 is able to input a destination toward which the motor vehicle is driving on its own, at least in the fully automated mode, while taking the traffic rules and the data acquired by the environment sensor system into account. In addition, motor vehicle 1 has for its operation a device 3 which includes an apparatus developed as camera device 4 and set up in such a way that it detects the driver of motor vehicle 1. Camera device 4 thus provides a camera image that includes the driver of motor vehicle 1.

Figure 2:
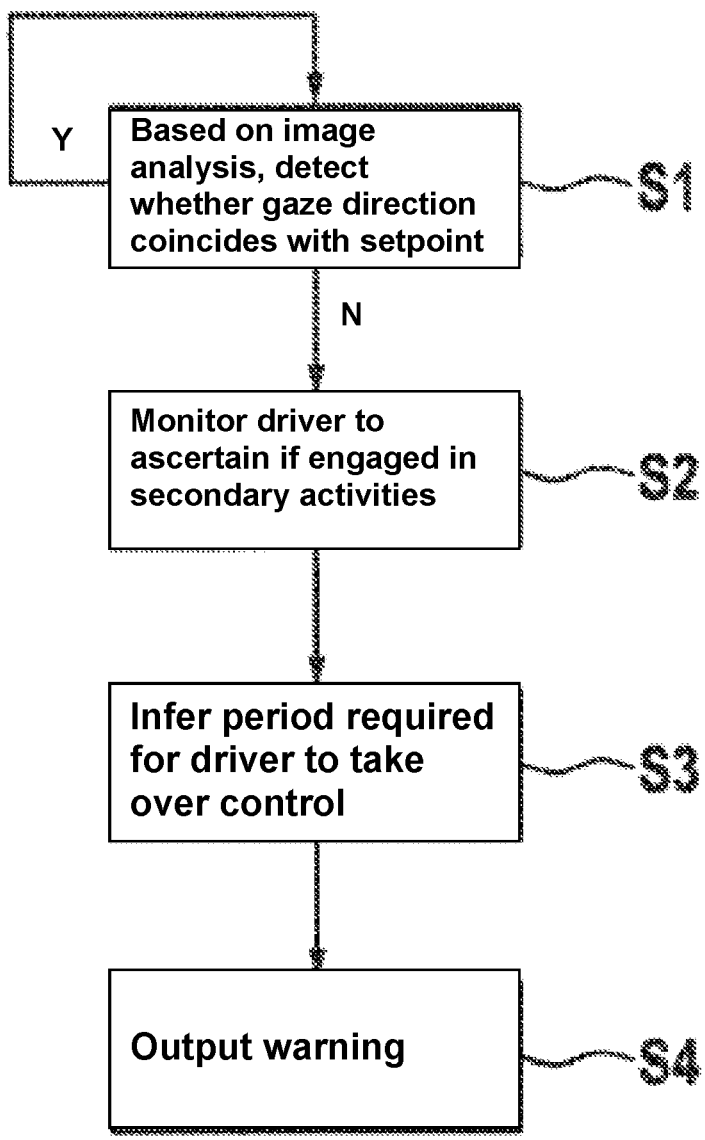
FIG. 2 shows a flow chart for illustrating a method for operating the motor vehicle.

FIG. 2 shows a flow chart, based on which a method for operating motor vehicle 1 by device 3 will be described. To begin with, the camera image supplied by the camera device is analyzed in a step S1 in order to detect the gaze direction of the driver. Apart from a camera sensor, camera device 4, for example, includes an infrared radiator which emits radiation toward the driver for this purpose, so that the infrared light is reflected at the retina of the driver's eyes. The gaze direction of the driver is ascertained as a function of the position of the pupilla and the reflection at the retina of the individual eye in relation to each other. Other procedures for detecting the gaze direction are conceivable as well.

If the gaze direction of the driver coincides with a setpoint gaze direction or if it does not deviate therefrom beyond a predefinable measure (j), it is concluded that the driver is looking in the driving direction and is therefore able to observe the traffic conditions in front of motor vehicle 1 on his own. However, if it is detected that the driver's gaze direction deviates beyond a predefinable measure from the setpoint gaze direction toward the traffic situation in front in the driving direction (n), the driver is monitored in a following step S2 in order to ascertain whether he is engaged in secondary activities. This is based predominantly on data from a passenger compartment sensor system, which in particular may not only include camera device 4, but also a microphone, a seat occupancy sensor, navigation system 2, or other operating devices. For any secondary activity to be detected there are certain behavior patterns and movement patterns that are sensed with the aid of the passenger compartment sensor system.

For example, it is provided to compare the movement characteristic of the gaze direction, i.e., a movement of the driver's eyes, with a movement reference characteristic that corresponds to line-by-line reading. For this purpose it is checked, for instance, whether the eyes repeatedly move from left to right and back, the gaze moving down a bit further upon each back-and-forth movement. It is also possible to check whether the eye movement to the right is slower than the movements to the left, so that reading to the right and a return motion to the left can be inferred. It is checked in particular whether the gaze direction is basically directed in the downward direction in order to detect whether the user is holding a book or the like and is reading it, for instance.

Moreover, an analysis of the camera image provided by the camera device makes it possible to monitor the mouth region of the driver, especially for lip movements. If movements of the mouth region, especially the lips, of the driver are detected, it is inferred in particular that the driver is speaking or is conversing with a further passenger of motor vehicle 1, for instance.

In addition, if the driver keeps a hand near the ear, for example, which can be detected by the camera device, or if a telephone system of the motor vehicle is being operated and talking of the driver is detected by movements of the mouth region, it is furthermore inferred that the driver is conducting a telephone conversation as secondary activity. In this respect, the secondary activity of the driver is also inferred as a function of a hand motion and/or hand position and/or the actuation of a further operating device, in this case, the telephone system.

In addition, a secondary activity is detected if the gaze direction of the driver is directed toward a display, e.g., of navigation system 2 or a general input system of motor vehicle 1, and user inputs are detected on an operating device, e.g., of navigation system 2. Two different features are therefore checked here, i.e., the gaze direction on the one hand, and a user input on the other in order to infer the operation of a device of the motor vehicle as secondary activity. As the case may be, however, it would also be possible to dispense with sensing the gaze direction toward the operating device.

Moreover, eating or drinking is inferred as secondary activity if corresponding movement patterns of the hand and the mouth region (such as chewing), for example, are detected. Cigarette smoking, too, can be determined by camera device 4 as secondary activity, for instance by detecting a movement characteristic of a hand and/or detecting the glow of a cigarette when the driver is drawing on the cigarette.

The afore-described secondary activities are not meant to represent a complete list of all detectable/recognizable secondary activities. The list can naturally be supplemented by further secondary activities.

The secondary activities are in particular detected by comparing the movement characteristics detected by the camera device with previously stored movement reference characteristics to each of which a secondary activity is allocated. This makes it particularly easy to detect the secondary activities. Each secondary activity to be detected or detected is preferably also assigned a safety ranking, which reflects the safety of the particular secondary activity in the context of the current driving operation of motor vehicle 1.

Using the secondary activities detected in step S2 and their safeties, the anticipated prevailing time period required by the driver in order to take over control of motor vehicle 1 based on the detected secondary activity is inferred in a subsequent step S3, preferably in a Bayesian network. Especially driver-related parameters, such as age, gender, reaction times noted so far or the driver's eyesight may also be taken into account in this context. The information indicating who is sitting behind the steering wheel of motor vehicle 1, for example, may be provided or ascertained via identification algorithms based on the camera image provided by camera device 4. It is also conceivable that the driver automatically identifies herself by a manual input or by a personal key when starting motor vehicle 1.

The measure for the anticipated take-over duration calculated in this way is then made available, preferably in the automatic or automated driving functionality of the motor vehicle. During highly automated driving, the driver is allowed to disengage from the driving task, provided he is able to resume the driving again within a time period defined in advance, such as 10 seconds. The distraction measure, and thus the anticipated required time period for assuming control of motor vehicle 1 following an activation of the partially automated or fully automated drive, is estimated in a simple and precise manner with the aid of the described method. The afore-described method increases the quality of this estimate in comparison with known methods.

To ensure the safety of the driving operation, it is optionally provided that a warning message or a warning signal is output to a driver in a step S4 when the previously defined time period has been exceeded, either in haptic, acoustic or visual manner, so that a timely alert is output that the secondary activity has gone on for too long and the driver should direct his attention to the driving situation in order to be able to quickly take over control of motor vehicle 1 again should this be required.

What is claimed is:
1. A method for operating a motor vehicle which is able to be driven at least partially automatically, the method comprising:
    detecting a gaze direction of a driver of the motor vehicle;
    inferring a distraction of the driver if the detected gaze direction deviates from a setpoint gaze direction by more than a predefined measure;
    monitoring the driver for a secondary activity if a distraction of the driver was inferred; and
    ascertaining, as a function of at least a detected secondary activity, a time period required for the driver to assume at least a partial control of the motor vehicle.
2. The method as recited in claim 1, further comprising:
    outputting a warning message to the driver as a function of the detected secondary activity.

3. The method as recited in claim 2, wherein an instant for outputting the warning message is ascertained as a function of at least one of the instant when the distraction was detected and the instant when the secondary activity was detected.

4. The method as recited in claim 2, wherein the time period required for the driver to assume at least a partial control of the motor vehicle is ascertained additionally as a function of at least one state parameter of the driver including at least one of the age, gender, a previously detected reaction time of the driver, and the driver's eyesight.

5. The method as recited in claim 4, wherein the instant for the output of the warning message is selected as a function of the ascertained time period.

6. The method as recited in claim 4, wherein a secondary activity of the driver is inferred as a function of a movement of the driver's eyes.

7. The method as recited in claim 4, wherein a secondary activity of the driver is inferred as a function of a movement of the lips of the driver.

8. The method as recited in claim 4, wherein a secondary activity of the driver is inferred as a function of at least one of a hand motion and a hand position.

9. The method as recited in claim 4, wherein a secondary activity of the driver is inferred as a function of an actuation of an operating device of the motor vehicle including at least one of an entertainment system, navigation system, and a climate control system.

10. A system for operating a motor vehicle which is able to be driven at least partially automatically, comprising:
   a gaze-detection device detecting a gaze direction of a driver of the motor vehicle;
   a second detection unit configure to detect a secondary activity of the driver; and
   a control device including a processor configured to:
      infer a distraction of the driver if the detected gaze direction deviates from a setpoint gaze direction by more than a predefined measure;
      monitor the driver using the secondary detection unit for a secondary activity if a distraction of the driver was inferred; and
      ascertain, as a function of at least a detected secondary activity, a time period required for the driver to assume at least a partial control of the motor vehicle.

11. The method as recited in claim 1, further comprising:
   comparing the ascertained time period to a predetermined time period; and
   conditional upon that a result of the comparison is that the ascertained time period is longer than the predetermined time period, outputting a warning signal.

12. The method as recited in claim 1, wherein the monitoring includes determining an amount of time that the driver has been performing the secondary activity, and wherein the ascertainment of the time period varies depending on the amount of time that the driver has been determined to have been performing the secondary activity.

13. A method for operating a motor vehicle which is able to be driven at least partially automatically, the method comprising:
   determining, by a processor and based on sensor signals, a direction of a gaze of a driver of the motor vehicle;
   based on the determined direction of the gaze, determining, by the processor, whether the driver is distracted;
   monitoring, by the processor and based on sensor signals, whether the driver is performing any of one or more predefined secondary activities;
   based on a result of the monitoring being that the driver is performing at least one of the one or more predefined secondary activities, ascertaining, by the processor, an amount of time required for the driver to perform a manual driving action in reaction to a stimulus, where the ascertaining is performed such that the amount of time depends on the at least one of the one or more predefined secondary activities that the monitoring indicates the driver to be performing;
   comparing, by the processor, the ascertained amount of time to a predetermined amount of time; and
   responsive to a determination of the comparison being that the ascertained amount of time is longer than the predetermined amount of time, executing, by the processor, a safety action;
   wherein the execution of the safety action based on the comparison is performed conditional upon that a result of the determining of whether the driver is distracted is that the driver has been determined to be distracted based on the direction of the gaze, so that even where the sensor signals being monitored are ones that, when ascertained in the monitoring, produce the result of a determination that the driver is performing the at least one of the one or more predefined secondary activities, the safety action is not performed if the processor does not determine the distractedness based on the determined gaze direction.

14. The method as recited in claim 13, wherein the safety action is performed while the vehicle is driving automatically and prior to determining a time by which the driving of the vehicle is to be taken over by the driver, and the stimulus is one that would be output at a moment that is (1) after determining the time by which the driving of the vehicle is to be taken over by the driver and (2) is approximately the predetermined amount of time prior to the time by which the driving of the vehicle is to be taken over.

* * * * *